United States Patent
Wilson et al.

(10) Patent No.: US 8,511,688 B2
(45) Date of Patent: Aug. 20, 2013

(54) INTERMITTENT SEALING DEVICE

(75) Inventors: David Gordon Wilson, Winchester, MA (US); Jon M. Ballou, Beverly, MA (US)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 13/033,538

(22) Filed: Feb. 23, 2011

(65) Prior Publication Data

US 2012/0018955 A1 Jan. 26, 2012

Related U.S. Application Data

(63) Continuation of application No. 11/582,233, filed on Oct. 17, 2006, now abandoned.

(60) Provisional application No. 60/728,991, filed on Oct. 21, 2005.

(51) Int. Cl.
*F16L 17/00* (2006.01)

(52) U.S. Cl.
USPC ........... 277/314; 277/312; 277/602; 277/603; 29/592; 29/428; 29/446; 29/450; 29/452

(58) Field of Classification Search
USPC ........... 29/450, 592, 428, 446, 452; 277/314, 277/312, 602, 603
See application file for complete search history.

(56) References Cited

U.S. PATENT DOCUMENTS

| | | | |
|---|---|---|---|
| 2,692,760 A | 10/1954 | Flurschutz | |
| 3,861,723 A * | 1/1975 | Kunz et al. | 285/410 |
| 4,183,539 A | 1/1980 | French et al. | |
| 4,206,803 A | 6/1980 | Finnemore et al. | |
| 4,357,025 A | 11/1982 | Eckart | |
| 4,373,575 A | 2/1983 | Hayes | |
| 4,651,809 A | 3/1987 | Gollnick et al. | |
| 4,720,969 A | 1/1988 | Jackman | |
| 4,783,085 A | 11/1988 | Wicks et al. | |
| 4,862,949 A | 9/1989 | Bell, III | |
| 5,259,444 A | 11/1993 | Wilson | |
| RE37,134 E * | 4/2001 | Wilson | 165/9 |
| 8,201,852 B2 * | 6/2012 | Linhorst et al. | 285/365 |
| 2005/0248098 A1 * | 11/2005 | Sisk et al. | 277/616 |
| 2006/0054301 A1 | 3/2006 | McRay et al. | |

FOREIGN PATENT DOCUMENTS

| | | |
|---|---|---|
| GB | 688657 | 3/1953 |
| GB | 689522 | 4/1953 |
| GB | 697377 | 9/1953 |
| GB | 1 348 375 | 3/1974 |

* cited by examiner

*Primary Examiner* — Peter DungBa Vo
*Assistant Examiner* — Azm Parvez
(74) *Attorney, Agent, or Firm* — Robert J. Hampsch

(57) ABSTRACT

An exemplary embodiment disclosed herein relates to an articulatable sealing device. The device includes a plurality of seal elements each of which is urgable against a seal-surface, a fixing member tightenable about a perimeter of the seal elements, and a retractor in operable communication with the plurality of seal elements and able to move the plurality of seal elements in a desired direction.

14 Claims, 6 Drawing Sheets

INTERMITTENT SEALING DEVICE

CROSS REFERENCE TO RELATED APPLICATIONS

This Application is a continuation of U.S. application Ser. No. 11/582,233, entitled "INTERMITTENT SEALING DEVICE AND METHOD" filed on Oct. 17, 2006, which is herein incorporated by reference in its entirety. Application Ser. No. 11/582,233 claims priority under 35 U.S.C. §119(e) to U.S. Provisional Application Ser. No. 60/728,991, entitled "CONFIGURATION FOR ADAPTABLE SEALS FOR REGENERATIVE HEAT EXCHANGERS (REGENERATORS)" filed on Oct. 21, 2005, which is herein incorporated by reference in its entirety.

BACKGROUND OF THE INVENTION

Seal arrangements between two members, which are in movement relative to each other, are known in the arts. But at high temperatures, above 500° C. for example, and applications where the leakage across the seal has to be minimal, of the order of 0.1% to 3.0%, over an extended lifecycle many of the conventional sealing mechanisms cannot comply with these requirements. One example of such an application is a regenerative heat exchanger (regenerator) in which a porous disk or drum is first rotated into a hot fluid flow and second into a cold fluid flow to thereby transfer heat from the hot fluid to the cold fluid. To minimize the wear of the seals in contact with the moving regenerator disk a discontinuous moving regenerator disk, with lifting seals, has been used. A description of such a regenerator can be found in U.S. Pat. No. RE37134 to David Gordon Wilson, which is included as a reference in its entirety herein. In some regenerator applications the mixing of the cold and the hot fluid is troublesome and should, therefore, be minimized. Such a mixing of hot and cold fluids results from leakage by the seals between the two fluids. In applications using lifting seals in discontinuous regenerators, the leakage, though low, may still be greater than desired due to distortions in the seal-surface. Such distortions may hold the lifting seals far enough from the seal-surface to permit unacceptable levels of leakage to occur. Accordingly, improvements in sealing in the presence of such seal-surface distortions would be desirable in the art.

BRIEF DESCRIPTION OF THE INVENTION

An exemplary embodiment disclosed herein relates to an articulatable sealing device. The device includes a plurality of seal elements each of which is urgable against a seal-surface, a fixing member tightenable about a perimeter of the seal elements, and a retractor in operable communication with the plurality of seal elements and able to move the plurality of seal elements in a desired direction.

Further disclosed herein relates to an articulatable sealing device. The device includes, a plurality of seal elements, and a fixing member for intermittently fixing the seal elements to one another. The device further includes a retractor for intermittently retracting the seal elements from contact with a seal-surface, and at least one biasing member to urge each of the plurality of seal elements individually against a seal-surface.

Further disclosed herein is an exemplary embodiment of a method of intermittently sealing to a surface. The method includes, independently urging at least one of a plurality of seal elements toward a seal-surface, intermittently clamping the plurality of seal elements to one another, and intermittently lifting the clamped plurality of seal elements away from the seal-surface. The method further includes intermittently releasing the clamp to thereby allow the seal elements to independently move toward and seal against a seal-surface.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of embodiments of the disclosed apparatus and method are presented herein by way of exemplification and not limitation with reference to the Figures.

Figure 1:
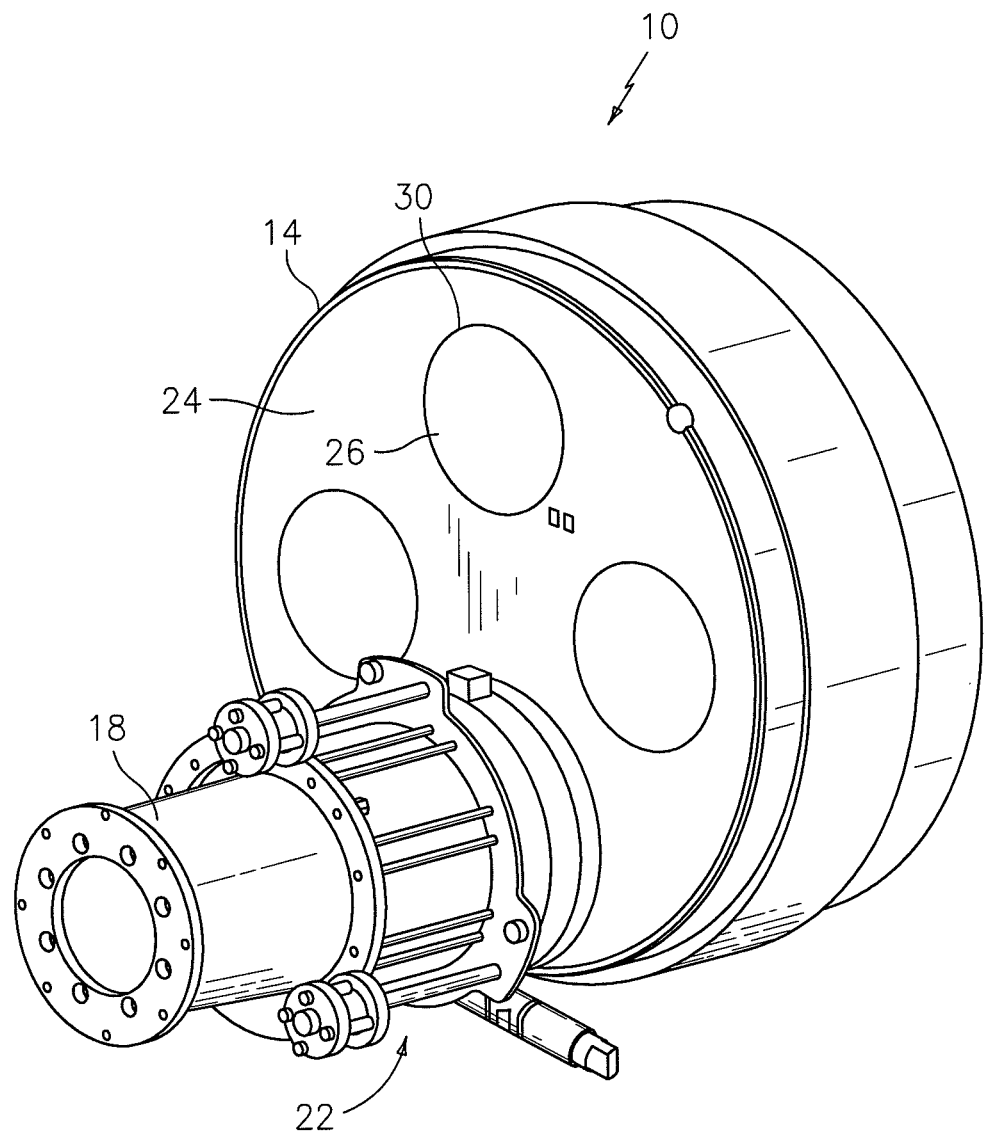
FIG. 1 depicts a perspective view of a regenerator disclosed herein.

Referring to FIG. 1 an embodiment of the invention will now be had with reference to a discontinuous regenerator shown generally at 10. The regenerator 10 includes a rotatable porous matrix 14, a fluid-carrying duct 18 and an actuatable seal device 22. The heat exchanger 10 is shown with a single duct 18 and seal device 22 employed; however, it should be understood that more than one duct 18 and seal device 22 may be employed on either or both sides of the matrix 14 while still remaining within the spirit and scope of the present invention.

The porous matrix 14 of the regenerator 10 has a seal-surface 24 thereon and a plurality of discrete flow compartments 26; four such compartments are illustrated in FIG. 1. Surrounding each flow compartment 26 is a seal line 30. Each seal line 30 defines a perimeter around one of the flow compartments 26 on the seal-surface 24. The seal device 22 forms a seal against the seal-surface 24 at the seal line 30 when the seal device 22 is actuated to the seal position. The seal line 30 may be in the shape of a circle as shown in FIG. 1 or may be other shapes such as triangular, for example, as is shown by a seal line 32 shown in FIG. 2. There are limitations on the shapes that the seal lines 30, 32 may take and these limitations are based on the construction of the seal device 22 that will be discussed in more detail now.

Referring again to FIG. 2, the seal device 22 uses a plurality of seal elements 34 to form the seal against the seal line 30 on the seal-surface 24 as is shown in this partial cross sectional view of the seal elements 34. In this embodiment each seal element 34 has a female radiused edge 38 and a male radiused edge 42 on a side opposite of the female radiused edge 38. The male edge 42 of one seal element 34 engages with the female edge 38 of an adjacent seal element 34 to form a seal between adjacent seal elements 34 while allowing the adjacent seal elements 34 to move and slide axially relative to one another. The shape of each seal element 34, in a seal device 22, can be identical to all the other seal elements 34 in the seal device 22 if for example the seal line 30 is a circle. Alternatively, the seal elements 34 may have various shapes in order to form a non-circular shape, as is the case for the seal line 32, for example. The number of seal elements 34 that are used by each seal device 22 can vary depending upon the particular application. The more seal elements 34 that are used for a given seal line 30, 32 the more the seal device 22 is able to seal against surfaces with imperfections as will be described below with reference to FIGS. 4A-4D.

Figure 3:
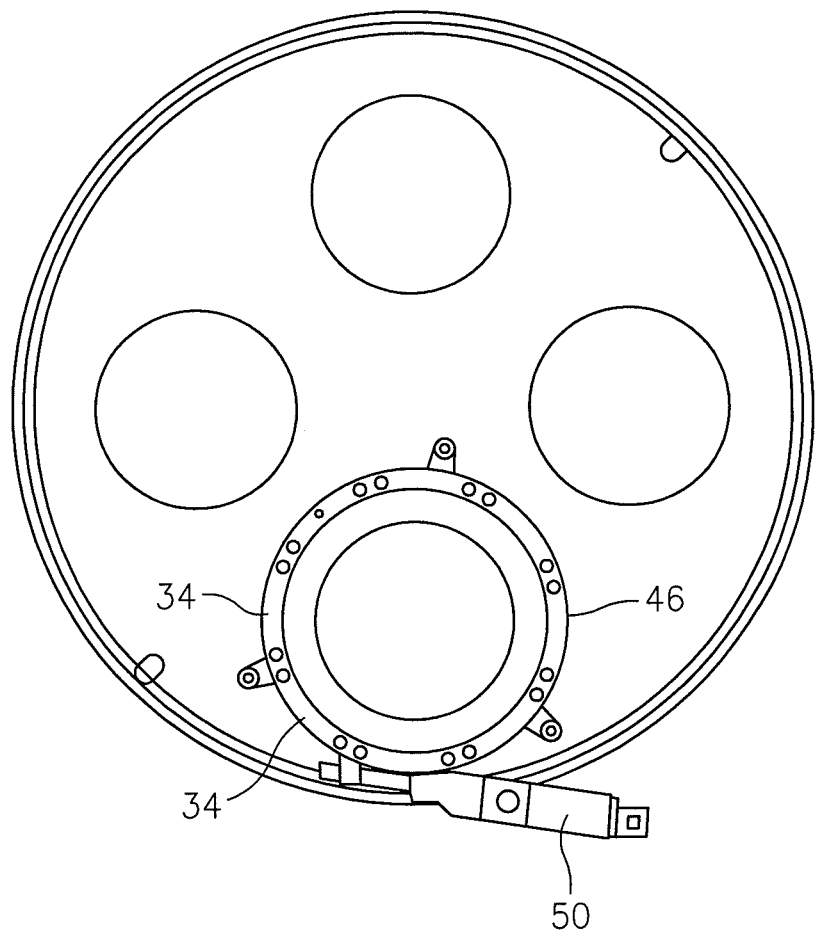
FIG. 3 depicts a plan view of a matrix, a plurality of seal elements and a fixing member disclosed herein.

Referring to FIG. 3 a seal element fixing member illustrated herein as a clamp ring 46 surrounds the perimeter of the seal elements 34. A clamp actuator 50 when actuated pulls the clamp ring 46 into tension around the seal elements 34, thus putting all of the seal elements 34 that create the closed shape into a circumferentially compressive force with each other seal element 34 in the particular seal device 22. The compressive force between adjacent seal elements 34 creates friction between adjacent seal elements 34 that causes the seal elements 34 to lift together as one assembly when they are lifted away from the matrix 14. The compressive force between adjacent seal elements 34 also creates a seal between adjacent elements 34 thereby preventing leakage therebetween. The clamp actuator 50 that tightens the clamp ring 46 may be pneumatic, hydraulic, servomotor controlled or controlled by any other applicable actuation that is known.

Figure 4A:
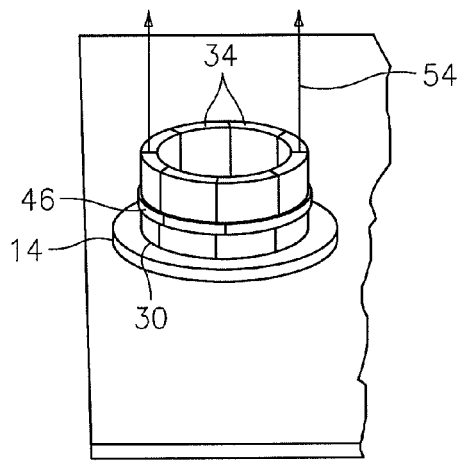
FIGS. 4A-4D depict perspective views of various stages of actuation of a sealing device disclosed herein.
Figure 4B:
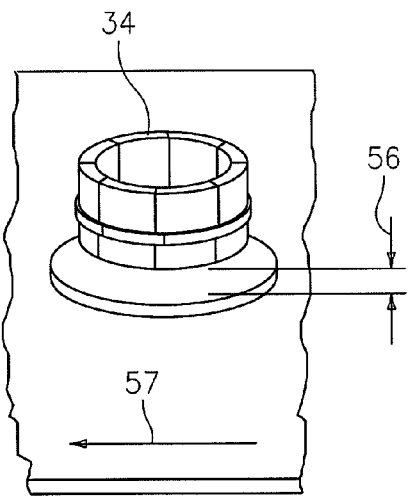
Figure 4C:
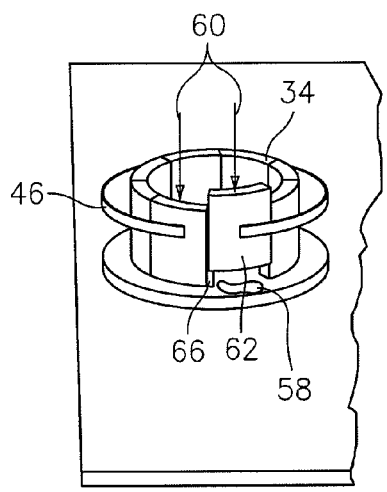
Figure 4D:
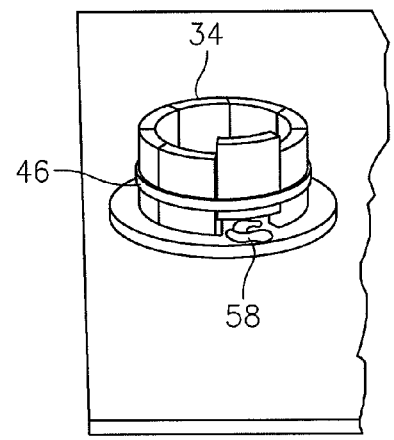

Referring to FIGS. 4A-4D various phases of the seal device 22 showing the clamping and releasing of the clamp ring 46 about the seal elements 34 and pulling and pushing of the seal elements 34 relative to the seal-surface 24 are shown in detail. In FIG. 4A the clamp ring 46 is in tension around the seal elements 34 and the seal elements 34 are sealed against the seal line 30 of the matrix 14. The clamp ring 46 has the seal elements 34 locked together as an assembly and can therefore be lifted away from the matrix 14 in the direction of arrows 54. With the seal elements 34 lifted away from the matrix 14 to form a clearance gap 56 as shown in FIG. 4B the matrix 14 is able to move, in direction of arrow 57 for example, relative to the seal elements 34 without causing wear of the seal elements 34. Each of the seal elements 34 is individually biased, in the direction of arrows 60, toward the matrix 14 such that upon release of the tension in the clamp ring 46 the biasing force urges the individual seal elements 34 to move toward and make contact with the matrix 14 as is shown in FIG. 4C. By individually urging each of the seal elements 34 the seal device 22 can permit each seal element 34 to make contact with the matrix 14. In so doing the largest gaps that will exist between the seal elements 34 and the matrix 14 will be smaller than if the seal elements 34 were not able to move independently of one another. This gap-size reduction of embodiments disclosed herein is especially effective in reducing gap sizes that occur when a distortion 58 exists on the surface of the matrix 14. The use of multiple seal elements 34 allows a single seal element 62 to be axially displaced with respect to the other seal elements 34 due to a local distortion 58, for example, and thereby to decrease the overall leakage that would result had the seal elements 34 not been allowed to move independently from the seal element 62 towards matrix 14. Embodiments with a greater number of seal elements 34 for a specific size seal line 32 will have smaller gap sizes since fewer seal elements 34 will be held away from the seal-surface 24 by the distortion 58. Once all the seal elements 34, 62 have moved toward and made contact with the matrix 14 the actuator 50 can actuate and apply tension to the clamp ring 46 to thereby lock the seal elements 34 together sealing them to one another and preventing movement of any individual seal element 34 in a direction away from the matrix 14.

Figure 5:
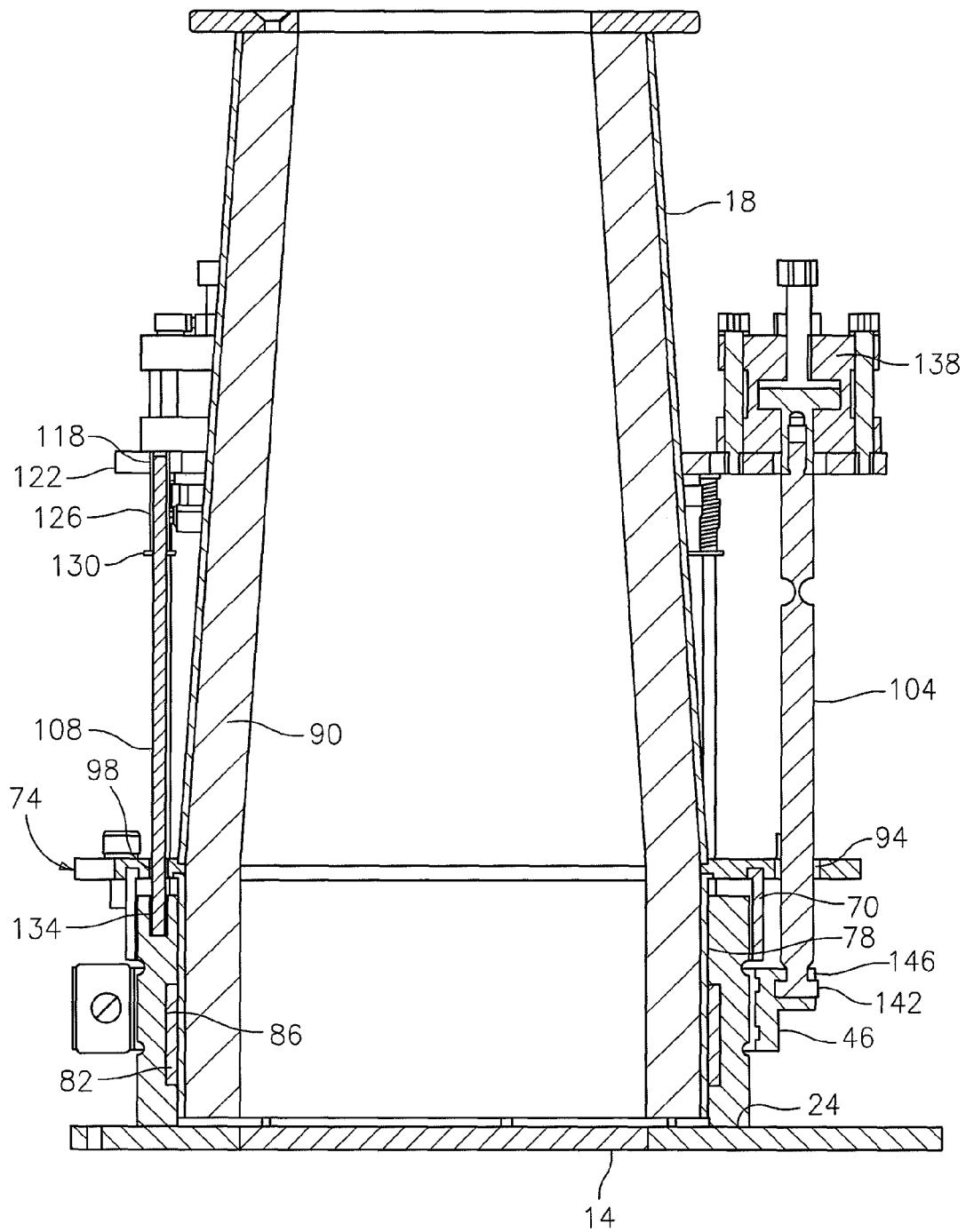
FIG. 5 depicts a cross sectional view of the regenerator shown in FIG. 1.
Figure 6:
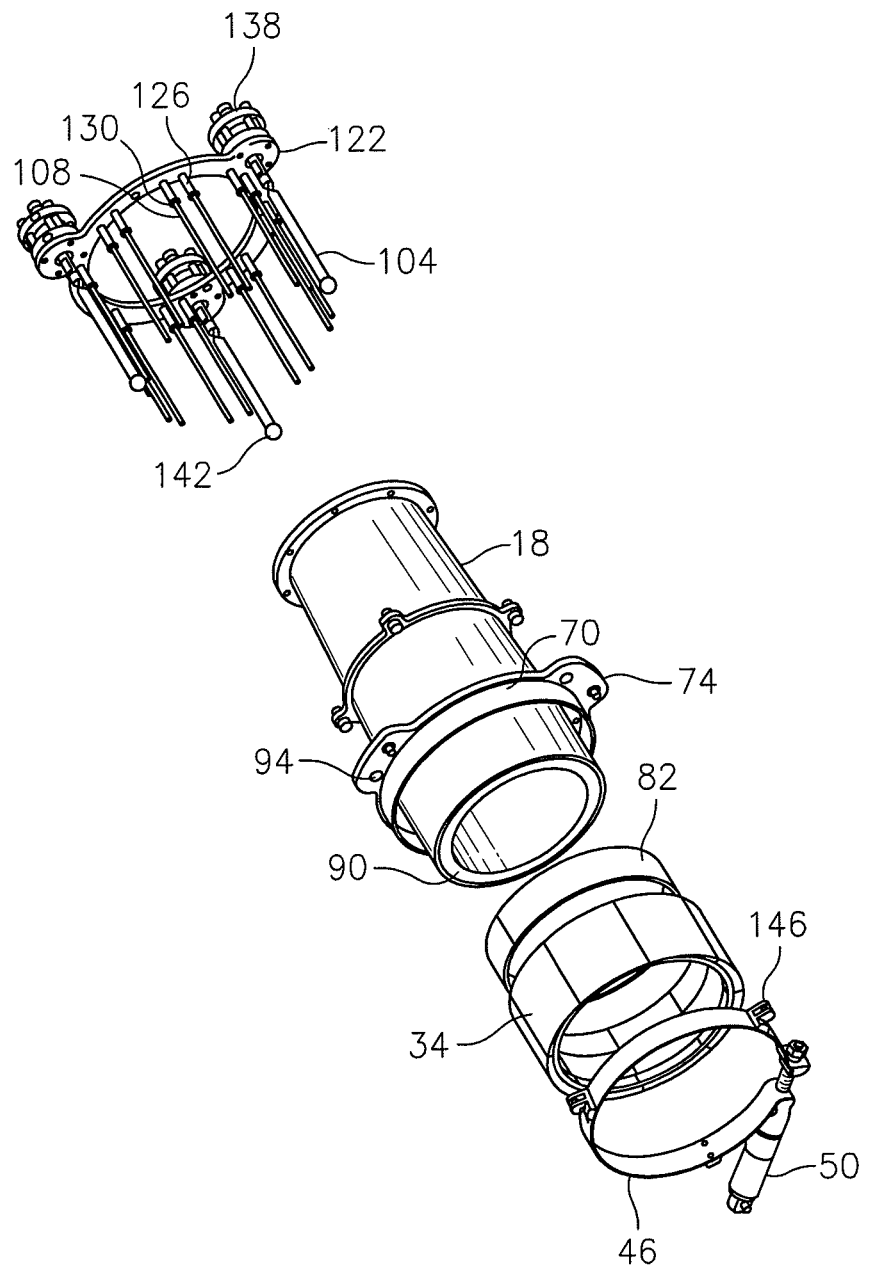
FIG. 6 depicts an exploded perspective view of the sealing device shown in FIG. 1.

Referring to FIGS. 1, 5 and 6 a detailed description of the seal device 22 and the mechanisms to control the movements of the seal elements 34 will now be described. In addition to the clamp ring 46 a ring shaped seal guide 70, which is attached to a guide flange 74, also surrounds and provides guidance to the seal elements 34. The seal guide 70 loosely surrounds the seal elements 34 to allow the seal elements 34 to move freely in an axial direction relative to the seal guide 70. The seal elements 34 ride on an outer surface 78 of the duct 18 and are sealed to the surface 78 with packing 82. The packing 82 is contained within a channel 86 formed circumferentially in the seal elements 34. Insulation 90 lines the inside of the duct 18 to minimize heat transfer to the seal device 22. For sealing between the duct 18 and the seal elements 34 known methods such as O-rings, for example, can be used if appropriate to the particular application. The seal guide 70 is stationary relative to the duct 18 and thus the seal elements 34 move relative to the seal guide 74.

Figure 2:
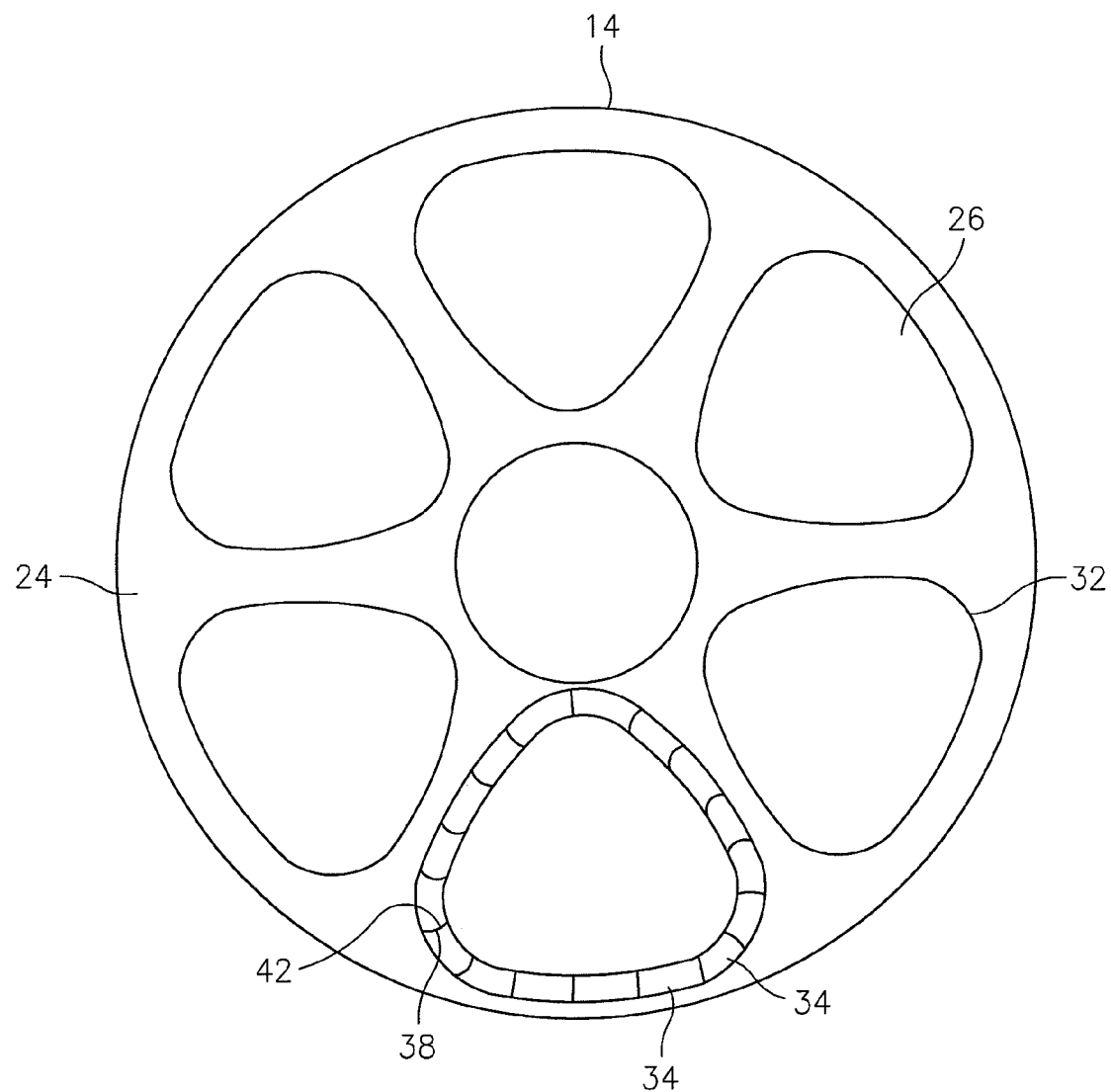
FIG. 2 depicts a plan view of a matrix disclosed herein.

The seal guide 74 can have a noncircular shape to control the shape of the seal elements 34 such that they form a noncircular seal shape such as would be required to seal against seal line 32 as shown in FIG. 2. The duct 18 may also have a noncircular shape to complement the shape of the seal guide 74. There are limits to the shapes that the seal line 32 and consequently the seal device 22 can take, however, which are due to the possibility of the seal elements 34, 62 collapsing radially inwardly if the compressive force applied to the seal elements 34, 62 is allowed to buckle an interface between seal elements 34, 62 radially inwardly. It is therefore recommended to maintain a convex curvature around the full perimeter of the seal line 32 to prevent such a buckling from occurring.

As described above the seal elements 34 move in both axial directions, specifically toward and away from the matrix 14. Holes 94 and 98 through the guide flange 74 permit pull rods 104 and push-rods 108 respectively to extend therethrough to urge the motion of the seal elements in the two directions. The push-rods 108 are also slidably engaged in holes 118 in an actuation support plate 122 that is attached to the duct 18 further from the location where the seal guide 74 is fixed to the duct 18. Each push-rod 108 has a push-rod biasing member depicted herein as a compression spring 126 compressed between the support plate 122 and a flange 130 on the push-rods 108. Thus the compression spring 126 is always in compression and is thereby supplying an urging force to the seal element 34 to which it is engaged in a direction toward the matrix 14. The push-rods 108 engage recesses 134 in the seal elements 34 to positively locate the push-rods 108 relative to the seal elements 34.

Each pull rod 104 is connected to a seal element retractor illustrated herein as an axial actuator 138 that when actuated pulls the pull rod 104 in a direction away from the matrix 14. The axial actuator 138 may be pneumatic, hydraulic, servomotor controlled or controlled by any other applicable actuation that is known. A head 142 on each rod 104, on the opposite end of the rod 104 than is connected to the actuator 138, engages with a latch 146 fixed on the clamp ring 46. Thus, when the actuator 138 is actuated the pull rod 104 pulls the clamp ring 46 in a direction away from the matrix 14. Several pull rods 104 and actuators 138 can be positioned around the seal guide 74 and support plate 122 to evenly distribute the load of the rods 104 on the clamp ring 46 to thereby control the motion of the clamp ring 46 resulting from the forces applied thereto. Alternate embodiments could have the pull rods 104 engaged directly to one or more of the seal elements 34. Since the seal elements 34 are secured to one another by the clamp ring 46 retracting the pull rods 104 with the actuator 138 would retract all of the seal elements 34 as well.

Depending upon the particular application employing the regenerator 10 disclosed herein, the temperatures of the fluid being sealed could be very high. For example in a gas turbine engine the hot fluid temperatures may be high enough to damage the springs 126 and the actuators 138 if they are located near the seal-surface 24 during times when the seal elements 34 are at the gap 56 distance from the seal-surface 24. To protect the springs 126 and the actuators 138, therefore, it may be desirable to locate the springs 126 and the actuators 138 at specific distances from these high-temperature locations. The lengths of the pull rods 104 and the push-rods 108 may therefore be customized for each application, such that longer rods 104, 108 are used for applications with higher-temperature fluids, for example, to thereby protect the springs 126 and the actuators 138 from heat damage. In applications with high temperatures it may be advantageous to use seal elements 34 made from materials such as ceramic, for example, such that the seal elements 34 may withstand the high temperatures without sustaining damage.

With the construction just described the push-rods 108 in response to the clamp actuator 50 releasing the tension in the clamp ring 46 are able to push the seal elements 34, individually, into contact with the seal-surface 24 of the matrix 14. Additionally, the pull rods 104 are able to pull all of the seal elements 34 simultaneously away from the seal-surface 24 of the matrix 14 in response to the clamp actuator 50 applying tension to the clamp ring 46. After this action the seal elements 34 are no longer in contact with the matrix 14 allowing the matrix 14 to move without causing wear of the seal elements 34.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A sealing device, comprising:
a plurality of seal elements each of which is urgable against a seal-surface, each seal element has an arcuate male edge on a first side and an arcuate female edge on a second side opposite the first side, and wherein the arcuate male edge of one seal element is engagable with the arcuate female edge of an adjacent seal element and is sealable thereto;
a fixing member tightenable about a perimeter of the seal elements;
a retractor in operable communication with the plurality of seal elements and able to move the plurality of seal elements in a desired direction; and
at least one pull rod sized to communicate an urging force of the retractor to the fixing member while preventing excess heat from reaching the retractor.

2. The sealing device of claim 1, further comprising at least one biasing member to urge the plurality of seal elements.

3. The sealing device of claim 1, wherein the retractor is engaged with the fixing member.

4. The sealing device of claim 1, wherein the retractor is engaged with at least one of the plurality of seal elements.

5. The sealing device of claim 1, wherein tightening of the fixing member around the perimeter of the plurality of seal elements fixes the seal elements to one another.

6. The sealing device of claim 1, further comprising: a clamp actuator for tightening the fixing member about the perimeter of the plurality of seal elements.

7. The sealing device of claim 1, wherein the plurality of seal elements are slidable relative to one another in response to the fixing member not being tightened.

8. The sealing device of claim 1, further comprising a seal guide for orienting the plurality of seal elements into a seal shape.

9. The sealing device of claim 1, wherein the plurality of seal elements are shaped to form a desired seal line shape.

10. The sealing device of claim 1, wherein the plurality of seal elements seal to one another forming a closed shape sealable to a duct.

11. The sealing device of claim 1, wherein the plurality of seal elements are made of ceramic.

12. The sealing device of claim 1, wherein the number of seal elements in the seal device is selected to minimize leakage between the seal device and a seal-surface.

13. The sealing device of claim 2, further comprising a plurality of push-rods sized to communicate the urging force of the at least one biasing member to the plurality of seal elements while preventing excess heat from reaching the at least one biasing member.

14. A sealing device, comprising:
a plurality of seal elements each of which is urgable against a seal-surface;
a fixing member tightenable about a perimeter of the seal elements;
a retractor in operable communication with the plurality of seal elements and able to move the plurality of seal elements in a desired direction; and
at least one pull rod sized to communicate an urging force of the retractor to the fixing member while preventing excess heat from reaching the retractor.

* * * * *